United States Patent Office 3,475,789
Patented Nov. 4, 1969

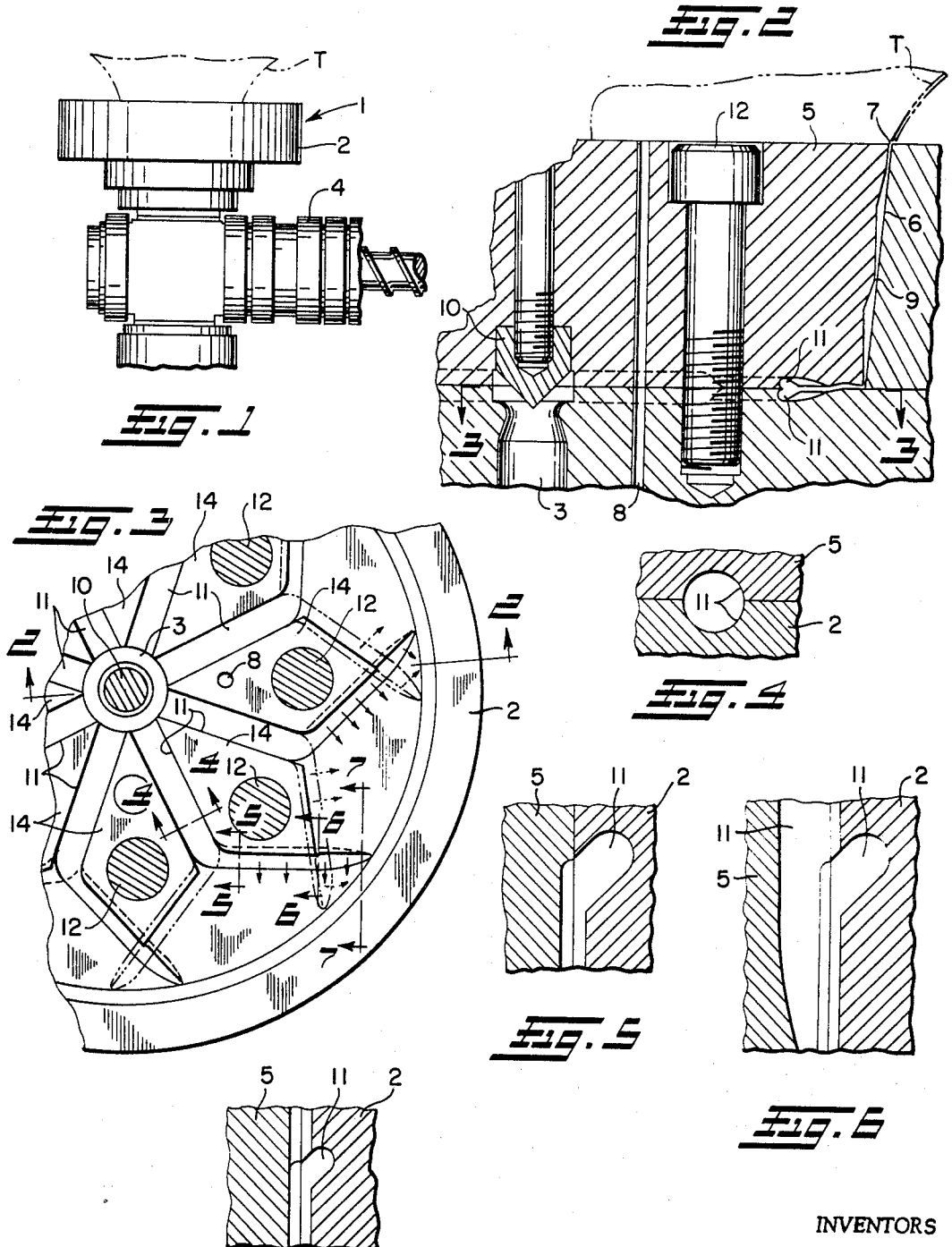

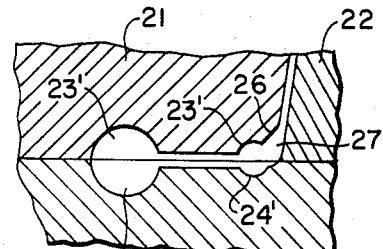
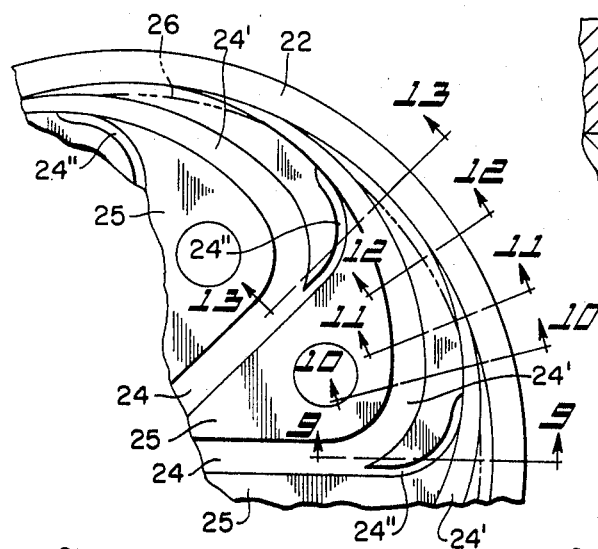
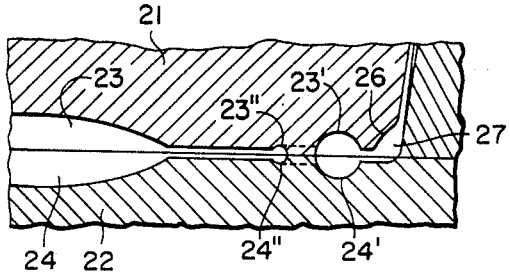
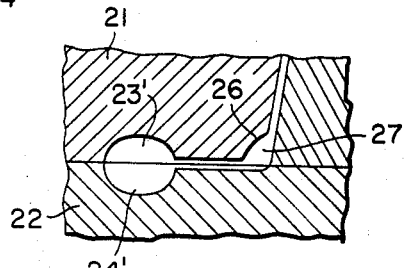
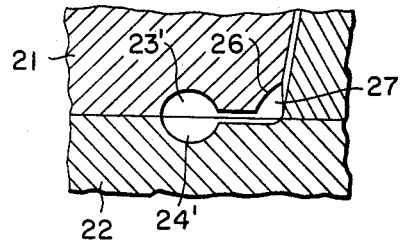
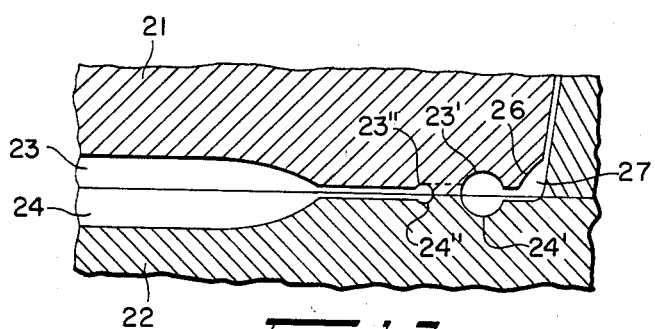

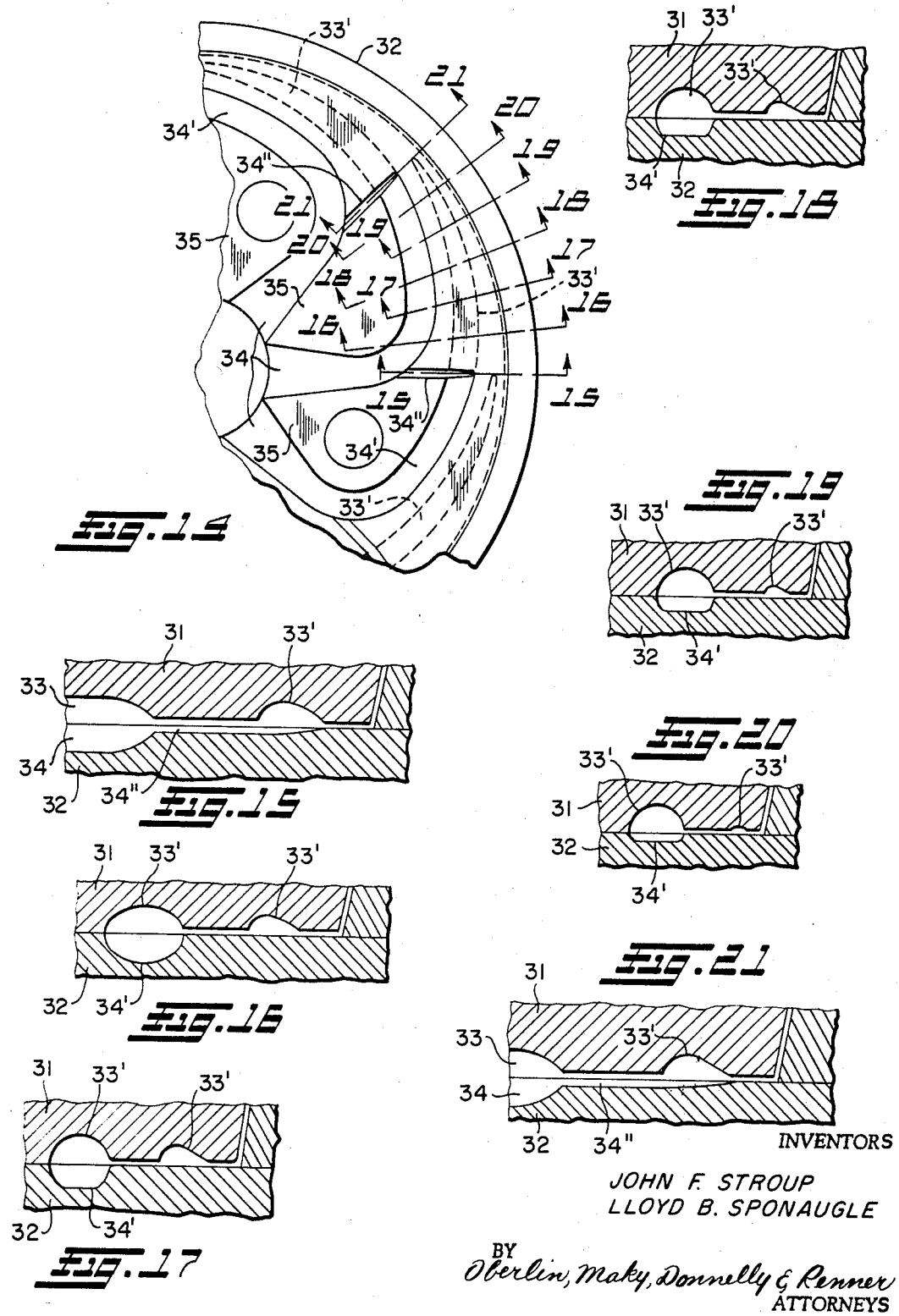

3,475,789
BLOWN FILM DIES
John F. Stroup, Cuyahoga Falls, and Lloyd B. Sponaugle, Akron, Ohio, assignors to NRM Corporation, Akron, Ohio, a corporation of Ohio
Filed Jan. 16, 1968, Ser. No. 698,327
Int. Cl. B29d 23/04
U.S. Cl. 18—14
9 Claims

ABSTRACT OF THE DISCLOSURE

Blown film die characterized in that mating die parts define therebetween an inlet port through which plasticized material as from an extruder is introduced into the die; an outlet port in the form of an annular slit from which the plastic material emerges in tubular form; and intervening channels between said ports through which the plastic material flows in the form of separate streams which are then rejoined upstream of the outlet port, the intervening channels being disposed to direct the plasticized material in different directions and velocities which will produce an overlapping and blending in the area of rejoinder thus eliminating weld line streaks, gauge variations and weaknesses.

BACKGROUND OF THE INVENTION

In known blown film extrusion as used for polyethylene, nylon, PVC and other plastics, the die essentially comprises a hollow cylindrical body having a mandrel or torpedo secured therein to define an annular extrusion slit. As the melt enters the die it is forced into the annular channel created by the shell of the die and the mandrel, the latter being supported at its base or around its periphery by fins or wing supports. During the course of the flow of the material from the inlet port to the annular outlet port the plastic material flows around these fins or wing supports and reunites before reaching the lips of the extrusion slit. Generally, air is introduced into the tubular extrudate through the torpedo or mandrel to expand the extrudate.

It has been found that as the plastic material flows around the fins or wing supports and reunites, the knit or weld lines extend directly across the thickness of the material thus causing streaks, gauge variations and structural weaknesses.

SUMMARY OF THE INVENTION

Contrary to the foregoing, in the present invention the passages around the fins or wing supports are fashioned to cause plastic flow in directions and velocities to induce lapping of adjacent streams so that the weld lines will extend diagonally of the cross-section thickness of the material, whereby to avoid the above-mentioned streaks, gauge variations and structural weaknesses.

It is one principal object of this invention to provide mating die parts in which the novel forms of fins and adjacent channels cause a variable velocity criss-cross flow of the adjacent streams of plastic material for overlap thereof so that the weld lines extend diagonally across from the outer surface to the inner surface of the extruded article.

It is another object of this invention to provide juxtaposed channels in the mating die parts which circumferentially overlap to produce the result aforesaid as the radially and circumferentially overlapped streams of plastic material merge with each other.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

BRIEF DESCRIPTION OF THE DRAWINGS

FIG. 1 is a side elevation view of one embodiment of the present invention;

FIG. 2 is a fragmentary radial cross-section view taken along line 2—2, FIG. 3;

FIG. 3 is a fragmentary top plan view as viewed downwardly along the line 3—3, FIG. 2, the channels in the bottom of the mandrel being shown in phantom lines;

FIGS. 4 to 7 are cross-section views taken along the respective lines 4—4 to 7—7, FIG. 3;

FIG. 8 is a fragmentary top plan view of another embodiment of this invention;

FIGS. 9 to 13 are cross-section views taken substantially along the respective lines 9—9 to 13—13, FIG. 8;

FIG. 14 is a fragmentary top plan view of yet another embodiment of the present invention; and FIGS. 15 to 21 are cross-section views taken substantially along the respective lines 15—15 to 21—21, FIG. 14.

DISCUSSION OF THE INVENTION

Figs. 1 to 7 embodiment

Referring first to FIGS. 1 and 2, the blown film die 1 there shown comprises a hollow cylindrical die part or body 2, having a central inlet port 3 in its bottom wall which registers with the outlet of an extruder 4. Bolted or otherwise secured to said body 2 is the mandrel or torpedo 5, which is centered within the cavity 6 of the body 2 to define an outlet port in the form of an annular slit 7 through which the plastic material is adapted to be extruded in tubular form and expanded as by air pressure admitted through passage 8. The exterior wall of the mandrel 5 may be of stepped formation as shown, to provide one or more pressure equalizing chambers 9 upstream of the outlet slit 7. The lower end of the mandrel 5 preferably has a conical spreader 10 to guide the plastic material into radial channels 11 formed in the respective opposed faces of the body 2 and mandrel 5. The radially extending portions of the channels 11 are preferably of semi-circular cross-section in the respective parts 2 and 5 so that when these parts are assembled as by bolts 12 extending through holes in the diamond shaped fins 14, the channels 11 define passages of circular cross-section, as best shown in FIG. 4.

In the body part 2, the outer part of each channel 11 extends along one side of the adjacent fin 14 to induce flow therefrom in a radial outward and clockwise direction as shown by the solid line arrows in FIG. 3, whereas the outer part of each channel 11 in the mandrel part 5 extends along the other side of the same fin 14 to induce flow therefrom in a radial outward and counterclockwise direction as shown by the phantom line arrows in FIG. 3. Where the outer channel portions cross, the flow of the material from the respective channels overlaps so that when the rejoined streams flow through the remaining passages of the die, the knits or weld lines, will extend circumferentially of the tubular extrudate T diagonally from the outer surface to the inner surface.

From FIGS. 4 to 7 it can be seen how the material emerging from the channels 11 will flow radially outwardly and in opposite directions to cross the flow from the oppositely disposed outer channel portions.

As aforesaid, in FIG. 3, the diamond-shaped areas 14 constitute the fins or wing supports around which the material flows through the channels 11 for rejoining by crossing flow such that the flow from one set of channel portions in the body part 2 is laminated to the flow from the other set of channel in the mandrel part 5.

FIGS. 8 to 13 embodiment

Referring now to FIGS. 8 to 13, the mandrel and body parts 21 and 22 have mating channels 23 and 24 which are directed generally tangentialy around the fins 25 to fade out as shown, in FIG. 8 and in the sections FIGS. 9 to 13, and to effect a welding of the streams together along diagonal lines extending from the outer surface of the tubular article T to the inner surface thereof. This is accomplished by providing registering channel parts 23' and 24' of decreasing radial width and axial depth as shown in FIGS. 8 to 13 and extending adjacent the outer edges of the fins 25. The concave edges of the fins 25 are channel parts 23" and 24" for merging flow with adjacent channel parts 23' and 24'. The corner 26 of the mandrel 21 is beveled to define a converging annular channel 27.

Thus, the adjacent streams of plastic material flowing in the channels 23 and 24, 23' and 24', and 23" and 24" merge together along diagonal lines.

FIGS. 14 to 21 embodiment

Finally, in the form of the invention disclosed in FIGS. 14 to 21 the mandrel and body parts 31 and 32 have channels 33 and 34 with channel parts 33' and 34' and 34" similar to those of FIGS. 8 to 13 but modified as clearly shown in FIGS. 14 to 21.

The channels 34' in the body part 32 are of decreasing depth and terminate at the channels 34" whereas the channels 33' in the mandrel 31 extend beyond the channels 34" and progressively fade out in radial width and axial depth.

This construction again achieves rejoining of the streams along weld lines which extend diagonally from the outer surface to the inner surface of the extruded article.

Other modes of applying the principle of the invention may be employed, change being made as regards the details described, provided the features stated in any of the following claims, or the equivalent of such, be employed.

We therefore particularly point out and distinctly claim as our invention:

1. An extrusion die comprising mating die parts providing an inlet port for introduction of plastic material, and an outlet port in the form of an annular slit from which the material is extruded in tubular form; and support means between said parts around which the material flows from said inlet port to said outlet port; said parts defining channels along opposite sides of said means disposed to overlap and blend adjacent streams of material flowing in said channels upon one another.

2. The die of claim 1 wherein the downstream portions of said channels in the respective parts converge and cross each other in different planes.

3. The die of claim 1 wherein the upstream portions of said channels extend in a generally radially outward direction from said inlet port and wherein the downstream portions of said channels extend in generally circumferential directions in circumferentialy overlapping relation with each other.

4. An extrusion die comprising mating die parts providing an inlet port for introduction of plastic material, and an outlet port in the form of a slit from which the material is extruded; and support fins between said parts around which the material flows from said inlet port to said outlet port; said parts defining channels along opposite sides of said fins disposed to laminate adjacent streams of material flowing in said channels upon one another thus to form weld lines extending diagonally across the thickness of the material adjacent the downstream ends of said fins.

5. The die of claim 4 wherein the downstream portions of said channels in the respective parts converge and cross each other in different planes.

6. The die of claim 4 wherein the upstream portions of said channels extend in a generally radially outward direction from said inlet port and wherein the downstream portions of said channels extend in generally circumferential directions in circumferentially overlapping relation with each other.

7. In an extrusion die of the type having plural channels through which plastic material flows longitudinally to form an extruded product adjacent the downstream ends of said channels, the improvement which comprises providing channels which are lateraly open along their downstream portions for lateral flow therefrom of a portion of the material flowing in each channel, adjacent channels being disposed to effect merger of laterally flowing material from one channel with longitudinally flowing material from the adjacent channel.

8. The extrusion die of claim 7 wherein adjacent channels cross each other in different planes.

9. The extrusion die of claim 7 wherein the downstream portions of adjacent channels extend in a circumferential direction and are radially spaced from one another so that the lateral flow of material from the radially inner channel merges with the longitudinal flow of material in the outer channel.

References Cited

UNITED STATES PATENTS

| | | |
|---|---|---|
| 2,910,726 | 11/1959 | Parshall et al. |
| 3,229,005 | 1/1966 | Reinjenhauser. |
| 3,291,879 | 12/1966 | Martin. |
| 3,343,215 | 9/1967 | Vinkeloe. |
| 3,358,329 | 12/1967 | Martin et al. |
| 3,394,433 | 7/1968 | Houvener. |

WILLIAM J. STEPHENSON, Primary Examiner

U.S. Cl. X.R.

18—12